(12) United States Patent
Nicot

(10) Patent No.: US 6,273,614 B1
(45) Date of Patent: Aug. 14, 2001

(54) ROLLING AND BEARING COMPRISING A TEMPERATURE COMPENSATING INSERT

(75) Inventor: Christophe Nicot, Epagny (FR)

(73) Assignee: SNR Roulements, Annecy (FR)

( * ) Notice: Subject to any disclaimer, the term of this patent is extended or adjusted under 35 U.S.C. 154(b) by 0 days.

(21) Appl. No.: 09/355,325

(22) PCT Filed: Jan. 23, 1998

(86) PCT No.: PCT/FR98/00115

§ 371 Date: Sep. 14, 1999

§ 102(e) Date: Sep. 14, 1999

(87) PCT Pub. No.: WO98/34037

PCT Pub. Date: Aug. 6, 1998

(30) Foreign Application Priority Data

Jan. 31, 1997 (FR) .................................................. 97 01051

(51) Int. Cl.[7] ........................................................ F16C 17/22
(52) U.S. Cl. ............................ 384/493; 384/557; 384/905
(58) Field of Search ............................ 384/493, 557, 384/905, 492, 513, 515, 569, 571, 536, 582

(56) References Cited

U.S. PATENT DOCUMENTS

| | | | | |
|---|---|---|---|---|
| 2,141,145 | * | 12/1938 | Wooler | 384/565 |
| 2,244,197 | * | 6/1941 | Hessler | 384/569 |
| 3,561,829 | * | 2/1971 | Heldt | 384/557 |
| 3,578,830 | * | 5/1971 | Pitner | 384/447 |
| 3,801,171 | * | 4/1974 | Rozentals | 384/492 |
| 4,718,781 | * | 1/1988 | Gerard | 384/495 |
| 5,028,152 | * | 7/1991 | Hill et al. | 384/557 |

* cited by examiner

*Primary Examiner*—Thomas R. Hannon
(74) *Attorney, Agent, or Firm*—Oblon, Spivak, McClelland, Maier & Neustadt, P.C.

(57) ABSTRACT

A rolling-contact bearing having a termal compensation insert. The bearing includes a first ring with a first ball race, a second ring with the second ball race, and a row of rolling bodies which obliquely contact the ball races. A compensating insert is in stop contact on one of the rings. One of the sheet metal rings has a supporting surface which is extended by a radial stop extension for blocking the insert axially and radially.

21 Claims, 3 Drawing Sheets

FIG. 1
FIG. 2
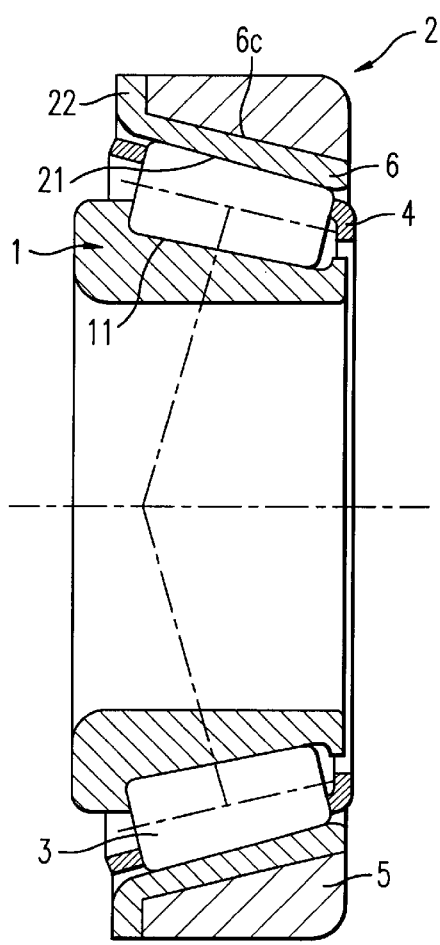
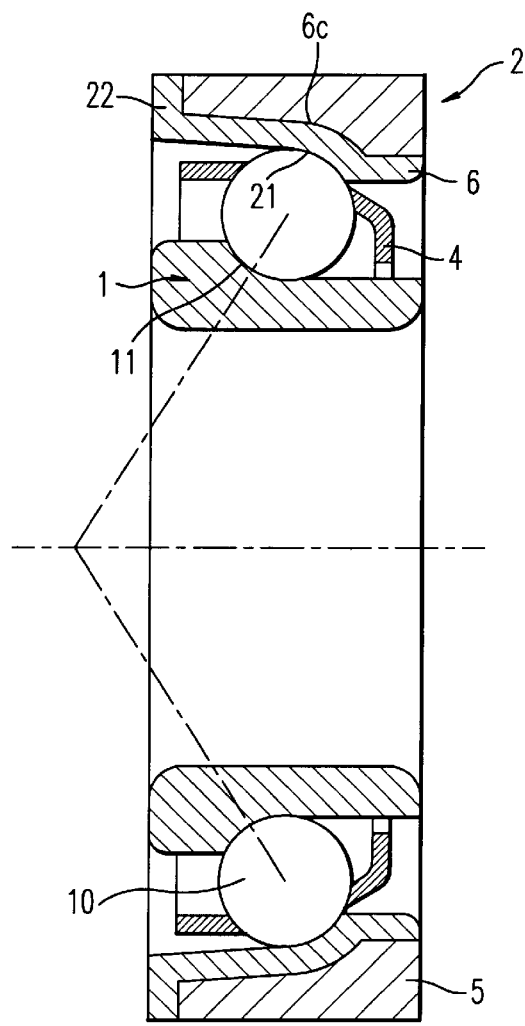

ROLLING AND BEARING COMPRISING A TEMPERATURE COMPENSATING INSERT

BACKGROUND OF THE INVENTION

1. Field of the Invention

The invention relates to a rolling-contact bearing and thrust bearing provided with a thermal compensation insert, comprising a first race provided with a first raceway, a second race provided with a second raceway, and a row of angular-contact rolling elements disposed in contact with the said raceways, wherein the insert compensates for thermal expansion variations and is in abutting contact on one of the races.

2. Discussion of the Background

European Patent Application EP A 0448239 describes a thrust bearing in the form of a rolling-contact bearing whose compensation insert is made of material with high coefficient of thermal expansion, capable of compensating, for example, for the difference between the expansion or contraction of a revolving shaft and an assembly case belonging to the thrust bearing and having different coefficients of thermal expansion.

Swiss Patent Application CH A 318272 describes a rolling-contact bearing in which the compensation insert is cast or injected into a groove located at the periphery of the outer race.

Such insert assemblies necessitate preliminary machining of the support race and an increase in the axial and/or radial overall size of the rolling-contact bearing.

French Patent Applications FR A 2135903 and 1537570 describe rolling-contact bearings whose races are formed of sheet metal, which may be provided with a hollow box profile and whose lateral rim is used to position the rolling elements.

SUMMARY OF THE INVENTION

According to the invention, one of the sheet-metal races of the rolling-contact bearing which ensures support for the compensation insert has a tapered land which is prolonged by a radial extension comprising an axial abutment for radial and axial immobilization of the insert.

The addition to the rolling-contact bearing of a sheet-metal race including a raceway permits economical production, from a conventional rolling-contact bearing, of a rolling-contact bearing provided with an interposable insert capable of compensation for differential thermal expansion, without significant dimensional modification of the rolling contact bearing thus obtained. This insert will be conveniently referred to hereinafter as "thermal compensation insert".

BRIEF DESCRIPTION OF THE PREFERRED EMBODIMENTS

Figure 3:
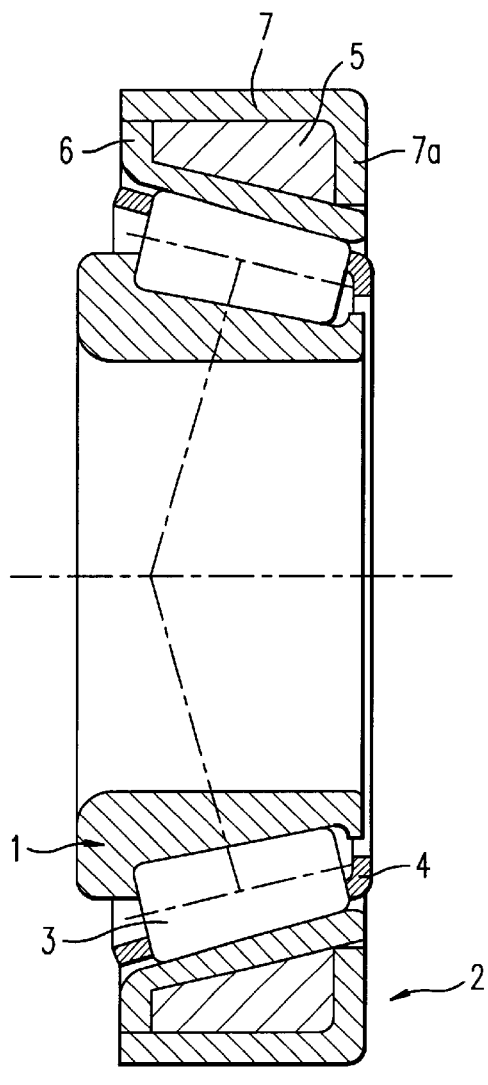
Figure 4:
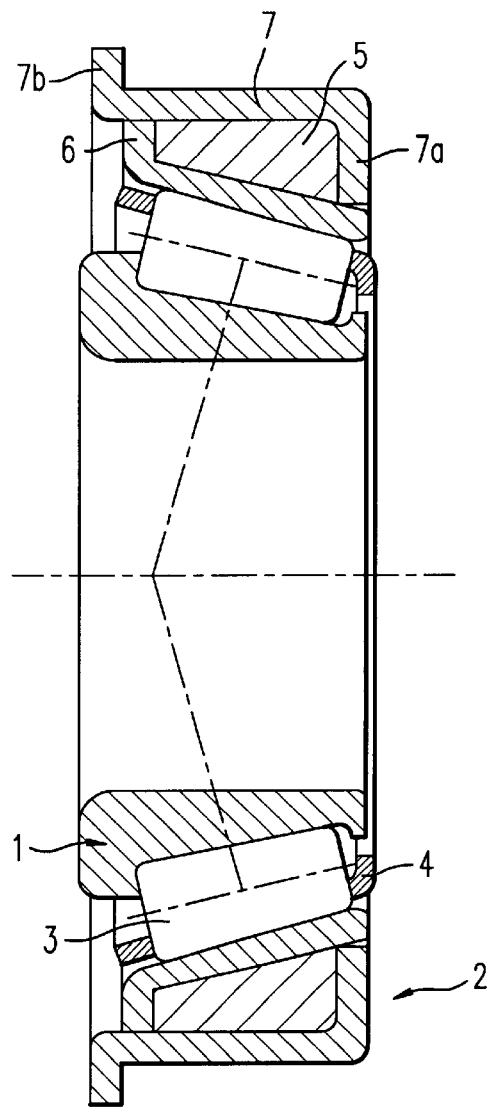
Figure 5:
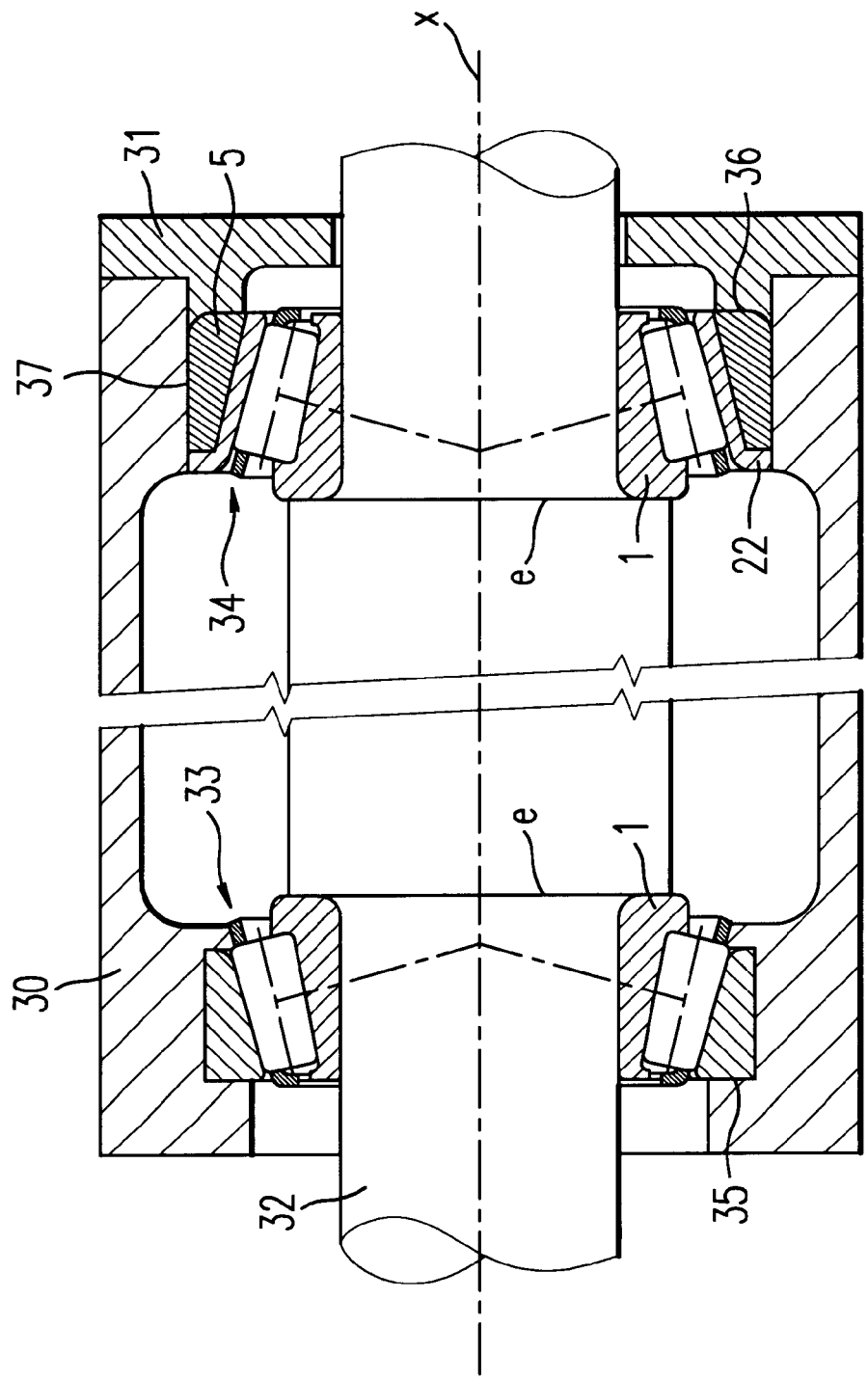

Other characteristics and advantages of the invention will become evident on reading the description of practical examples of the rolling-contact bearing and of its operating assembly with a thrust bearing, provided with reference to the attached drawings, wherein:

FIG. 1 is a radial section of a rolling-contact bearing with taper rollers according to the invention, FIG. 2 is a radial section of a rolling-contact bearing with angular-contact balls according to the invention, FIGS. 3 and 4 are radial sections of two alternative embodiments of the rollingcontact bearing illustrated in FIG. 1, FIG. 5 represents an axial section of a thrust bearing illustrating the operating assembly of a rolling-contact bearing such as illustrated in FIG. 1.

DETAILED DESCRIPTION OF THE PREFERRED EMBODIMENT

FIG. 1 is a radial section of a rolling-contact bearing with taper rollers comprising an inner race 1 provided with a first raceway 11, an outer race 2 provided with a second raceway 21, and a row of taper rollers 3 mounted in a cage 4 and disposed in contact with the raceways 11, 21.

Compensation insert 5 is in axially abutting contact with the inside face of a radial extension 22 of race 2, comprising in the present case a bush 6 or substantially frustoconical sheet-metal fitting. The inside surface of bush 6 comprises raceway 21, while the outside surface of the bush comprises tapered land 6c, which prolongs radial extension 22 comprising the abutment for axial and radial immobilization of insert 5.

FIG. 2 represents a rolling-contact bearing in which a row of angular-contact balls 10 rolls in contact with raceways 11, 21 defined by inner race 1 and bush 6.

The other functional elements of the rolling-contact bearing are not described, because they are made in the same way as the elements of the rolling-contact bearing illustrated in FIG. 1. They are therefore assigned the same references.

FIGS. 3 and 4 represent alternative embodiments of the rolling-contact bearing illustrated in FIG. 1.

In this case compensation insert 5 is located in a fitting with hollow box profile formed by the first inner bush 6 and by an outer bush 7 rabbeted axially onto insert 5. In this case insert 5 is integral with both bushes 6, 7.

As shown in FIG. 3, outer bush 7 has a bottom 7a folded radially toward the axis of revolution of inner race 2 of the rolling-contact bearing against which insert 5 is axially braced. Bottom 7a is in this case substantially located in the plane of the side face of the rolling-contact bearing.

As shown in FIG. 4, outer bush 7 has a radial extension 7b oriented substantially in the plane of another side face of the rolling-contact bearing. Bush 7 thus has an S-shaped cross section with substantially radial arms 7a, 7b, which respectively ensure abutment of insert 5 and abutment of the rolling-contact bearing in contact with a lateral compartment of a case.

FIG. 5 represents the sectional view of a thrust bearing, including the operating assembly of a rolling-contact bearing according to FIG. 1.

A fixed case 30 is closed by an adjusting plate 31 cast from a light metal alloy such as aluminum alloy.

A shaft 32, for example of steel, revolves in case 30 and is supported by thrust bearings 33, 34 in the form of angular-contact rolling-contact bearings.

Rolling-contact bearings 33, 34 respectively possess an inner race 1 fitted onto two corresponding lands of shaft 32 and are braced against shoulders e of shaft 32.

Shoulders (e) are respectively turned toward axially spaced thrust bearings 33, 34 in the form of rolling-contact bearings. Thrust bearings 33, 34 are respectively mounted in contact with a wall of abutment 35 machined in a compartment of case 30 and in contact with a wall of abutment 36 supported by plate 31 of case 30.

In conformity with the example shown in FIG. 1, outer race 2 of rolling-contact bearing 34 is made of sheet metal and has a radial extension 22 with abutment face turned from thermal compensation insert 5. The insert is therefore mounted on a substantially tapered land between the abutment face of extension 22 and the wall of axial abutment 36 supported by case 30.

The thermal compensation insert is preferably made of thermoplastic polymer material such as a polyoxymethylene, a phenylene polysulfide, a polyether imide or a polyamide.

However, this polymer material may also be an elastomer filled with metallic particles. The filling of metallic particles in this case endows the elastomer with physical characteristics comparable to those of a thermoplastic polymer.

As an example, there will be used a synthetic material whose coefficient of thermal expansion is between $50 \times 10^{-6}$ and $150 \times 10^{-6}$, whose modulus of elasticity is lower than 7000 N/mm$^2$ and whose compressive yield strength is greater than 50 N/mm$^2$.

It is quite evident that the compensation insert can be associated with either the outer race or inner race of the rolling-contact bearing as desired, without departing from the scope of the invention.

What is claimed is:

1. A rolling-contact bearing comprising:
   a first race having a first raceway;
   a second race having a second raceway;
   a plurality of rolling elements disposed between said first and second raceways;
   a thermal compensation insert abutting on one of said first and second races;
   a case configured to accommodate said first race, second race, plurality of rolling elements and thermal compensation insert; and
   a light metal alloy adjusting plate configured to close said case;
   wherein said one of the first and second races is configured to support the thermal compensation insert and has a land portion prolonged by a radial extension configured to prevent axial and radial motions of said thermal compensation insert.

2. A rolling-contact bearing according to claim 1, wherein said light metal alloy adjusting plate comprises aluminum.

3. A rolling-contact bearing according to claim 1, wherein the thermal compensation insert is a synthetic material whose coefficient of thermal expansion is between $50 \times 10^{-6}$ and $150 \times 10^{-6}$, modulus of elasticity is lower than 7000 N/mm$^2$ and compressive yield strength is greater than 50 N/mm$^2$.

4. A rolling-contact bearing according to claim 1, wherein the thermal compensation insert is an elastomeric material filled with metallic particles.

5. A rolling-contact bearing according to claim 1, wherein the thermal compensation insert comprises a thermoplastic polymer material selected from the group consisting of polyoxymethylene, phenylene polysulfide, polyether imide and polyamide.

6. A rolling-contact bearing according to claim 1, further comprising a hollow box profile having two rabbeted bushes including an outer bush having an S-shaped cross section with substantially radial arms and an inner bush forming an interior portion with one of said first and second raceways, wherein the thermal compensation insert is provided in said hollow box profile.

7. A thrust bearing comprising the rolling-contact bearing according to claim 1.

8. A rolling-contact bearing according to claim 1, further comprising a sheet-metal fitting having a bottom portion folded radially toward a rotational axis of other one of said first and second races, wherein the thermal compensation insert is positioned at a periphery of said one of the first and second races and is integral with said sheet-metal fitting.

9. A rolling-contact bearing according to claim 8, wherein the thermal compensation insert is a synthetic material whose coefficient of thermal expansion is between $50 \times 10^{-6}$ and $150 \times 10^{-6}$, modulus of elasticity is lower than 7000 N/mm$^2$ and compressive yield strength is greater than 50 N/mm$^2$.

10. A rolling-contact bearing according to claim 8, wherein the thermal compensation insert is an elastomeric material filled with metallic particles.

11. A rolling-contact bearing according to claim 8, wherein the thermal compensation insert comprises a thermoplastic polymer material selected from the group consisting of polyoxymethylene, phenylene polysulfide, polyether imide and polyamide.

12. A rolling-contact bearing according to claim 8, further comprising a hollow box profile having two rabbeted bushes including an outer bush having an S-shaped cross section with substantially radial arms and an inner bush forming an interior portion with one of said first and second raceways, wherein the thermal compensation insert is provided in said hollow box profile.

13. A rolling-contact bearing according to claim 8, wherein the sheet-metal fitting has an oriented radial extension.

14. A rolling-contact bearing according to claim 13, wherein the thermal compensation insert is a synthetic material whose coefficient of thermal expansion is between $50 \times 10^{-6}$ and $150 \times 10^{-6}$, modulus of elasticity is lower than 7000 N/mm$^2$ and compressive yield strength is greater than 50 N/mm$^2$.

15. A rolling-contact bearing according to claim 13, wherein the thermal compensation insert is an elastomeric material filled with metallic particles.

16. A rolling-contact bearing according to claim 13, wherein the thermal compensation insert comprises a thermoplastic polymer material selected from the group consisting of polyoxymethylene, phenylene polysulfide, polyether imide and polyamide.

17. A rolling-contact bearing according to claim 13, further comprising a hollow box profile having two rabbeted bushes including an outer bush having an S-shaped cross section with substantially radial arms and an inner bush forming an interior portion with one of said first and second raceways, wherein the thermal compensation insert is provided in said hollow box profile.

18. A rolling-contact bearing comprising:
    a first race having a first raceway;
    a second race having a second raceway;
    a plurality of rolling elements disposed between said first and second raceways; and
    a thermal compensation insert abutting on one of said first and second races;
    wherein the thermal compensation insert is an elastomeric material filled with metallic particles.

19. A rolling-contact bearing according to claim 18, wherein the thermal compensation insert comprises a thermoplastic polymer material selected from the group consisting of polyoxymethylene, phenylene polysulfide, polyether imide and polyamide.

20. A rolling-contact bearing according to claim 18, further comprising a hollow box profile having two rabbeted bushes including an outer bush having an S-shaped cross section with substantially radial arms and an inner bush forming an interior portion with one of said first and second raceways, wherein the thermal compensation insert is provided in said hollow box profile.

21. A rolling-contact bearing comprising:

a first race having a first raceway;

a second race having a second raceway;

a plurality of rolling elements disposed between said first and second raceways;

a thermal compensation insert abutting on one of said first and second races; and a hollow box profile having two rabbeted bushes including an outer bush having an S-shaped cross section with substantially radial arms and an inner bush forming an interior portion with one of said first and second raceways, wherein the thermal compensation insert is provided in said hollow box profile.

* * * * *